July 3, 1934.   C. SAUZEDDE   1,964,745

PISTON HEAD SEAL FOR HYDRAULIC BRAKE MECHANISM

Filed Sept. 4, 1931

INVENTOR
Claude Sauzedde,
BY
ATTORNEYS

Patented July 3, 1934

1,964,745

UNITED STATES PATENT OFFICE 1,964,745

PISTON HEAD SEAL FOR HYDRAULIC BRAKE MECHANISM

Claude Sauzedde, Detroit, Mich., assignor to Detroit Hydrostatic Brake Corporation, Detroit, Mich., a corporation of Michigan Application September 4, 1931, Serial No. 561,209

6 Claims. (Cl. 309—23)

The present invention relates to means especially adapted for sealing braking-mechanism pistons actuated by high fluid pressure developed and applied by either or both hand and foot controlled operating mechanism.

Figure 1:
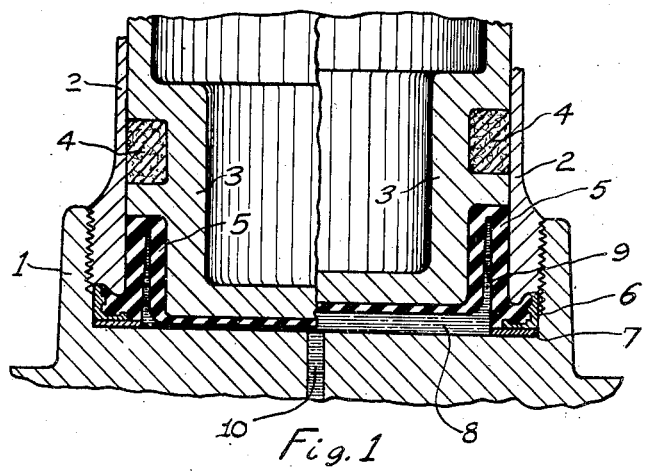
Figure 2:
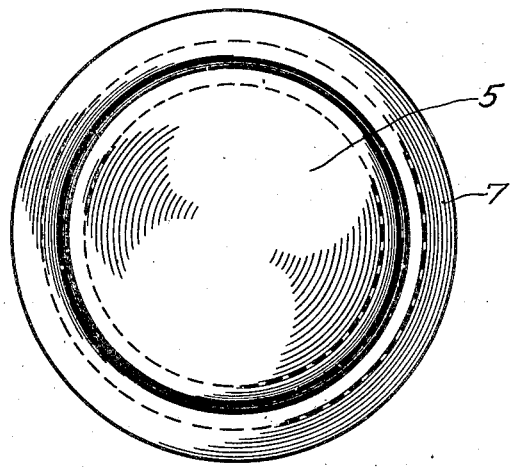
Figure 3:
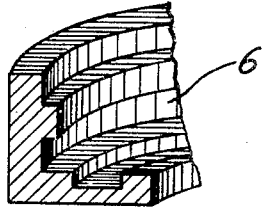
Figure 4:
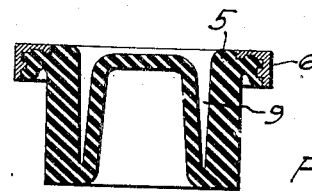

The object of the invention is to provide non-leakable sealing between a piston head and cylinder wall by means of a flexible seal sufficiently elastic to permit of stretching or otherwise deforming it to accommodate movement of the piston, against the head of which, as well as against the cylinder wall, the seal is held tightly by fluid pressure. Application of the seal to a plurality of radially-disposed cylinders of braking mechanism within a closed braking wheel hub structure is illustrated by my co-pending application Serial Number 558,299 filed August 20, 1931. Of the accompanying drawing wherein the same reference numbers are applied to like parts, Figure 1 is a sectional elevation showing the seal and piston in two positions, that corresponding approximately to conditions existing when brake shoes are retracted or "off" being indicated at the left, the position of piston and seal when brakes are "on" or "set" being approximately indicated at the right hand side, difference in location for "off" and "on" braking conditions indicating that the maximum outward radial movement of the piston members by which fluid pressure actuates the brake shoes is comparatively small even when brake-shoe linings are worn out;

Fig. 2 is a bottom view of the seal showing the annular space between the upstanding concentrically-disposed "doubled-up" side walls thereof;

Fig. 3 is a cross sectional view of the metal reinforcing ring embedded in the seal flange to resist the peripheral clamping stress set up when the cylinder body is screwed into the threaded recess serving as the closed or head end of cylinder in which sealed piston moves, and Fig. 4 shows a slightly modified form of seal for a compressor piston having a head stepped to greater depth, thus involving a correspondingly deeper cupping of the seal, which in other than dimensional respects is like that shown in Fig. 1 and is applied in the same way.

Referring to Fig. 1, the cylinder-supporting structure 1 is recessed and threaded to receive the inner or "head" end of the cylinder body 2 within which the stepped-head piston 3 reciprocates, the wide packing 4 conserving the small amount of lubricant required to prevent binding at any point of the slight movement to which the piston is subjected.

The flexible seal 5 is of extensible material peripherally reinforced by a stress-resisting ring 6 under which is placed a gasket 7, the spaces 8 and 9 being filled when fluid under pressure is forced through passage 10 by an external compressor having cylinders and pistons to which the same type of seal is fitted, as indicated by my co-pending application Serial Number 608,660, filed May 2, 1932.

The reinforcing ring insert 6 is of serrated angle section, as indicated by the enlarged view presented in Fig. 3. It is firmly embedded in and cemented to the deformable material of the seal, giving to its outwardly-projecting circumferential flange the absolute rigidity required for clamping it between the inner or head end of cylinder 2 and an underlying gasket 7 at the bottom of the threaded recess of the supporting structure into which the cylinder end is screwed. The stretchable material of the seal 5 is doubly cupped to an inner shape conforming to that of the piston head and an outer cylindrical shape conforming to the bore of the cylinder, an annular space being formed between the concentrically-disposed inner faces of the inner and outer cup walls, the latter having an integral reinforced clamping flange into which the rounded edge of the cylinder body is tightly pressed when it is screwed into place against the upper edge of the stress-resisting reinforcing ring 6 sealed by gasket 7.

Resistance to pressure against the resilient walls of the seal is afforded by the piston head and coaxially-disposed walls of both cylinder and piston, deformation of the seal, which takes place when the piston moves, having no harmful influence on the effectiveness of the seal in preventing leakage of fluid and consequent loss of pressure.

Having described my invention and its application with sufficient clarity to enable persons skilled in the art to which it relates to make effective use of it, I claim.

1. As a means for sealing a fluid-actuated piston relative to the cylinder bore in which the piston operates, an extensible circular seal comprising a molded body having a stress-resisting reinforcing ring of angle section embedded in and cemented to an outwardly-projecting peripheral flange of the body, said body having a wall foldable upon itself to provide inner and outer concentric walls positionable between the cylinder bore and a peripheral wall of the piston with the inner wall including a bottom adapted to overlie the end of the piston, whereby the positioned seal will present the space between the concentric walls as open to the fluid-receiving chamber of the cylinder to subject said walls to the piston-actuating fluid-pressure applied in shifting the piston relative to the end of the cylinder to thereby cause the pressure to be active to hold the walls of the body in non-leaking contact with the piston and cylinder.

2. A molded deformable seal shaped to fit the head of a piston and the bore of a cylinder in which said piston is reciprocable, said seal including a wall folded upon itself to provide inner and outer concentric walls, the outer wall of said seal having an outwardly-projecting peripheral flange against which the head end of said cylinder is tightly pressed, a serrated stress-resisting reinforcing ring of angle section embedded in and cemented to said flange to form an approximately integral part thereof, said concentric walls being adapted to bear respectively against the side of the piston and the inner wall of the cylinder with the space between the concentric walls open to permit access of fluid pressure between said walls.

3. A circular, doubly-cupped resilient seal having integral spaced-apart inner and outer concentric peripheral walls respectively engaging the head of a piston and the bore wall of a cylinder within which said piston reciprocates, the outer wall of the seal having an outwardly-projecting circumferential flange against which the head end of said cylinder is pressed in sealing engagement, said flange having a serrated reinforcing ring of angle section embedded and cemented therein for transferring the major portion of the clamping stress brought to bear on said flange to an underlying gasket and cylinder-supporting structure, an annular space being provided between the inner and outer peripheral walls of said seal to receive fluid under pressure for forcing said walls into sealing contact with said piston and cylinder.

4. As a means for sealing a fluid-actuated piston relative to the cylinder formation in which the piston operates, an elastic sealing element of generally cupped formation to overlie the end of the piston with the cup wall extending between the piston and cylinder, said cup wall being recessed inwardly from the opposite face of the element to receive fluid pressure in the direction of movement of the piston, said element having a peripheral metallic reinforce anchored thereto and adapted to be positioned by the cylinder formation, whereby fluid pressure active to move the piston will concurrently elongate the wall portion of the element.

5. An element as in claim 4 characterized in that the metallic reinforce is of annular configuration and of greater external diameter than the bore diameter of the cylinder.

6. An element as in claim 4 characterized in that the element is of molded characteristic and the reinforce is of annular configuration and of an internal cross-sectional contour such as to provide an anchoring relation with the adjacent portion of the element and thereby preserve the sealing action during movement of the piston.

CLAUDE SAUZEDDE.